(12) United States Patent
Zarn

(10) Patent No.: US 7,341,231 B2
(45) Date of Patent: Mar. 11, 2008

(54) ACCESSORY MOUNTING SYSTEM FOR A BOAT

(75) Inventor: Paul David Zarn, Henning, MN (US)

(73) Assignee: Lund Boat Company, Minneapolis, MN (US)

( * ) Notice: Subject to any disclaimer, the term of this patent is extended or adjusted under 35 U.S.C. 154(b) by 207 days.

(21) Appl. No.: 10/674,916

(22) Filed: Sep. 29, 2003

(65) Prior Publication Data

US 2005/0067542 A1    Mar. 31, 2005

(51) Int. Cl.
*E04G 5/06*    (2006.01)
*A47F 5/08*    (2006.01)

(52) U.S. Cl. .............................. 248/225.11; 211/94.01; 403/294

(58) Field of Classification Search ................ 248/674, 248/311.2, 220.21, 224.51, 224.61; 114/364, 114/343
See application file for complete search history.

(56) References Cited

U.S. PATENT DOCUMENTS

| | | | | |
|---|---|---|---|---|
| 3,654,648 A | * | 4/1972 | Wilhoit ...................... 114/361 |
| 3,810,267 A | * | 5/1974 | Fussell et al. .............. 114/361 |
| 4,194,636 A | * | 3/1980 | Byram et al. ............. 211/41.12 |
| 4,209,098 A | * | 6/1980 | Adams ...................... 211/70.8 |
| 4,771,897 A | * | 9/1988 | Ho ............................ 211/85.9 |
| 4,863,082 A | * | 9/1989 | Evans et al. ................ 224/406 |
| 4,869,378 A | * | 9/1989 | Miller ..................... 211/94.01 |
| 5,014,458 A | * | 5/1991 | Wagner ..................... 43/21.2 |
| 5,322,296 A | * | 6/1994 | Weimerskirch ............. 463/50 |
| 5,438,789 A | * | 8/1995 | Emory ...................... 43/21.2 |
| 5,577,856 A | * | 11/1996 | Tezuka ....................... 403/294 |
| 6,152,312 A | * | 11/2000 | Nava et al. .............. 211/94.01 |
| 6,227,505 B1 | * | 5/2001 | Van Order et al. ..... 248/222.13 |
| 6,481,679 B1 | * | 11/2002 | Bennett et al. ......... 248/224.51 |
| 6,561,117 B1 | * | 5/2003 | Kell ........................... 114/343 |
| 6,591,541 B1 | * | 7/2003 | Cummings ................ 43/21.2 |
| 6,698,603 B2 | * | 3/2004 | Lawson et al. .......... 211/94.01 |
| 6,871,749 B2 | * | 3/2005 | Bostick et al. ........... 211/94.01 |

\* cited by examiner

*Primary Examiner*—Anita M. King
(74) *Attorney, Agent, or Firm*—Malin Haley DiMaggio Bowen & Lhota, PA

(57) ABSTRACT

An accessory mounting device for securing an accessory to a track. The accessory mounting device includes a slide connector having a first portion that mounts within the track and a second portion that projects outwardly from the track. The accessory mounting device also includes an accessory mounting bracket that slides over the second portion of the slide connector.

27 Claims, 10 Drawing Sheets

ACCESSORY MOUNTING SYSTEM FOR A BOAT

TECHNICAL FIELD

The present invention relates generally to accessory mounting systems. More particularly, the present invention relates to systems for mounting accessories to boats.

BACKGROUND

Boats have been improved to enhance deck organization. An important aspect of deck organization relates to the organization of boat accessories. Example accessories include fish locators, cell phone holders, cup holders, fishing rod holders, global positioning units, bimini top mounting brackets, as well as other structures. In some prior art boats, accessories are mounted at fixed locations on the boat. For example, the accessories can be integral with the boat or affixed to mounting plates fastened to the boat with fasteners such as screws. One problem with these types of accessory mounting systems relates to the inability to move accessories to different positions. Another problem with this type of accessory mounting system relates to the fasteners making holes in the boat.

To overcome the above-identified problems, accessory mounting systems have been developed that utilize a track provided on the interior of the boat. Mounting brackets are used to mount accessories to the track. The mounting brackets typically include a threaded metal fastener for clamping the brackets to the track. Problems with this type of system relate to ease of use, the inability to provide secure/stable connections, and scratching or other damage to the boat caused by metal fasteners.

SUMMARY

One inventive aspect of the present disclosure relates to an accessory mounting system for securing an accessory to a track. The accessory mounting system includes an accessory mount to which an accessory such as a bimini top mount, a fishing rod holder, a cell phone holder, fish locator/depth finder, a global positioning unit, a cup holder or any other accessory can be mounted. The system also includes a slide connector for connecting the accessory mount to the track. The slide connector includes a first portion that fits within the track and a second portion over which the accessory mount is slid to secure the accessory mount to the track. In certain embodiments, the accessory mounting system can include a cam for tightening the accessory mount against the track as the accessory mount is slid along the slide connector.

Examples of a variety of inventive aspects in addition to those described above are set forth in the description that follows. It is to be understood that both the forgoing general description and the following detailed description are exemplary an explanatory only and are not restrictive of the broad inventive aspects that underlie the examples disclosed herein.

DETAILED DESCRIPTION

Figure 1:
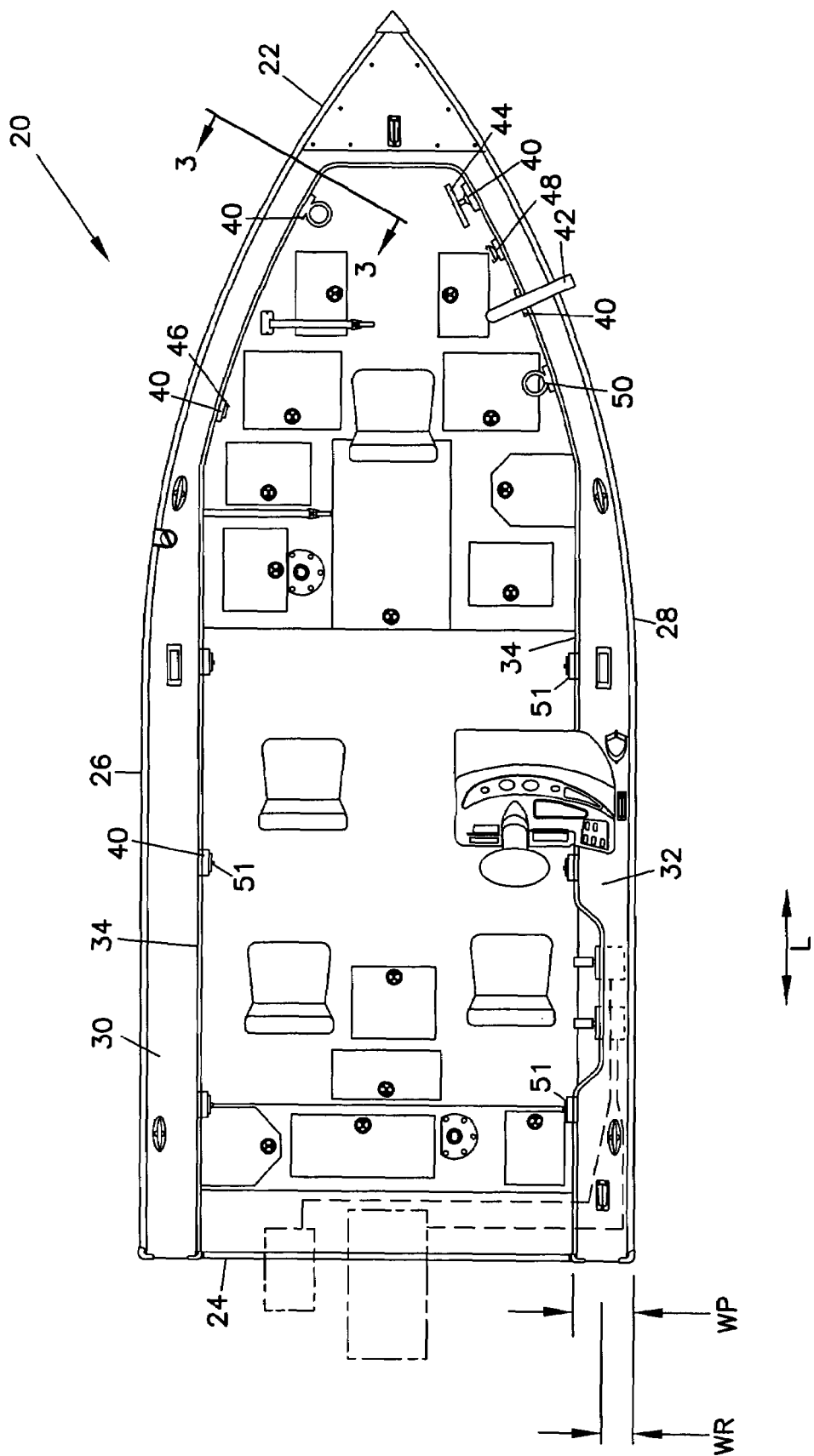
FIG. 1 is a top, plan view of a boat incorporating an accessory mounting system having features that are examples of inventive aspects in accordance with the principles of the present disclosure.

FIG. 1 shows a boat 20 including an accessory mounting system having features that are examples of inventive aspects in accordance with the principles of the present disclosure. The boat 20 includes a bow 22 and a stem 24. The boat also includes a port side 26 and a starboard side 28. A starboard weatherboard 30 defines a top deck that extends along the starboard side 26 of the boat 20. A port weatherboard 32 defines a top deck that extends along the port side 28 of the boat 20. Accessory mounting tracks 34 extend along the inboard edges of the weatherboards 30, 32 generally from bow 22 to stem 24. Accessory mounting devices 40 in accordance with the principles of the present disclosure are used to secure accessories to the accessory mounting tracks 34. In FIG. 1, the accessory mounting devices 40 are shown mounting accessories such as a fishing rod holder 42, a fish locator 44, a global positioning unit 46, a cell phone holder 48, a cup holder 50, and bimini top mounting structures 51 to the boat 20. The accessory mounting devices 40 can also be used to secure other types of accessories to the boat 20.

Figure 3:
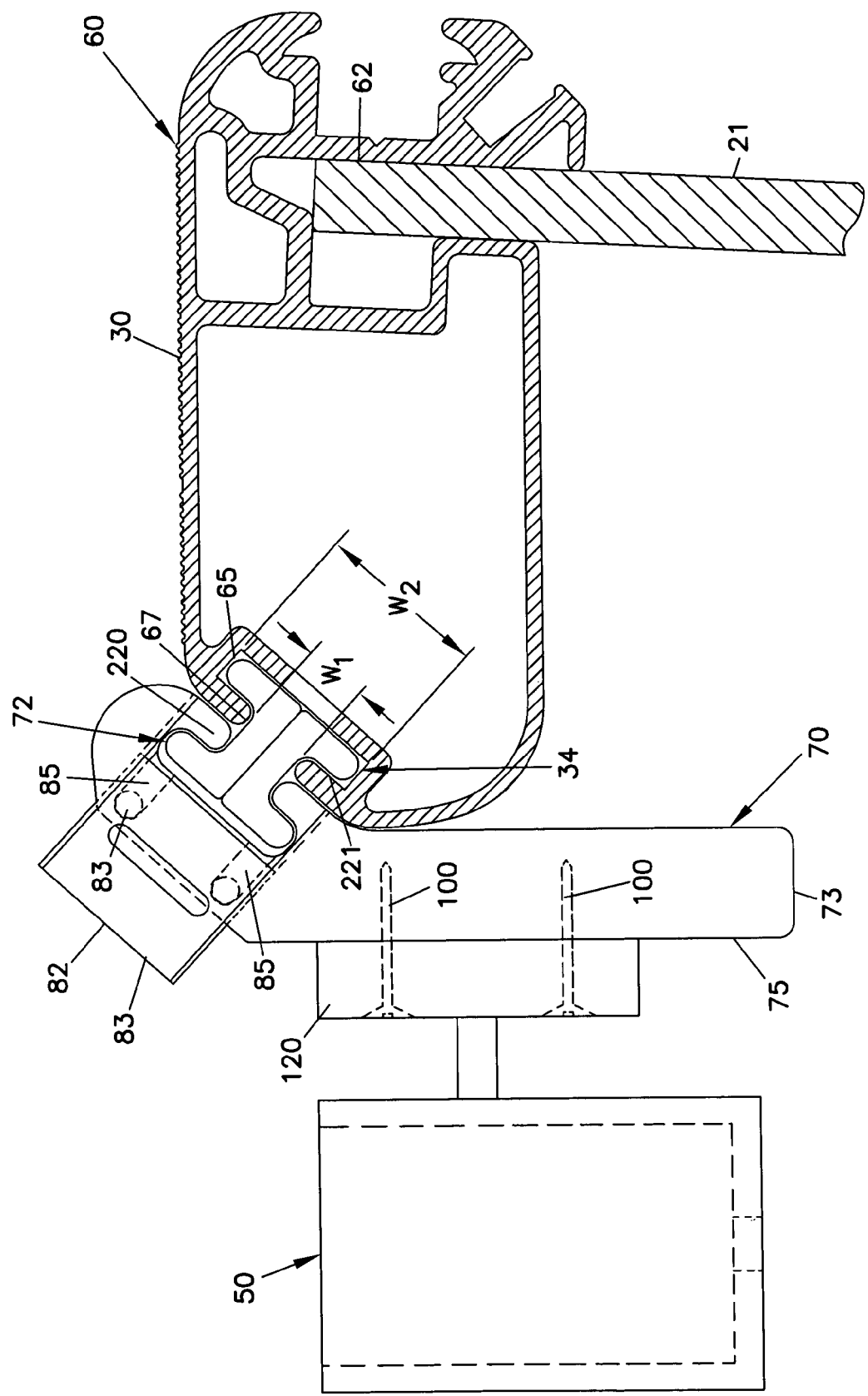
FIG. 3 is a cross-sectional view taken along section line 3-3 of FIG. 1.

Referring to FIG. 3, the tracks 34 of the depicted embodiment are defined by extrusions 60. The extrusion 60 of FIG. 3 includes a slot 62 for receiving the upper edge of the hull 21 of the boat 20 and includes a top portion defining weatherboard 30. The track 34 of FIG. 3 includes an interior region 65 that can be accessed through an access slot 67. The access slot 67 has a width $W_1$ that is narrower than a corresponding width $W_2$ of the interior region. In other embodiments, the tracks can be placed at different locations than those depicted, and need not be part of the top deck extrusion.

Figure 2:
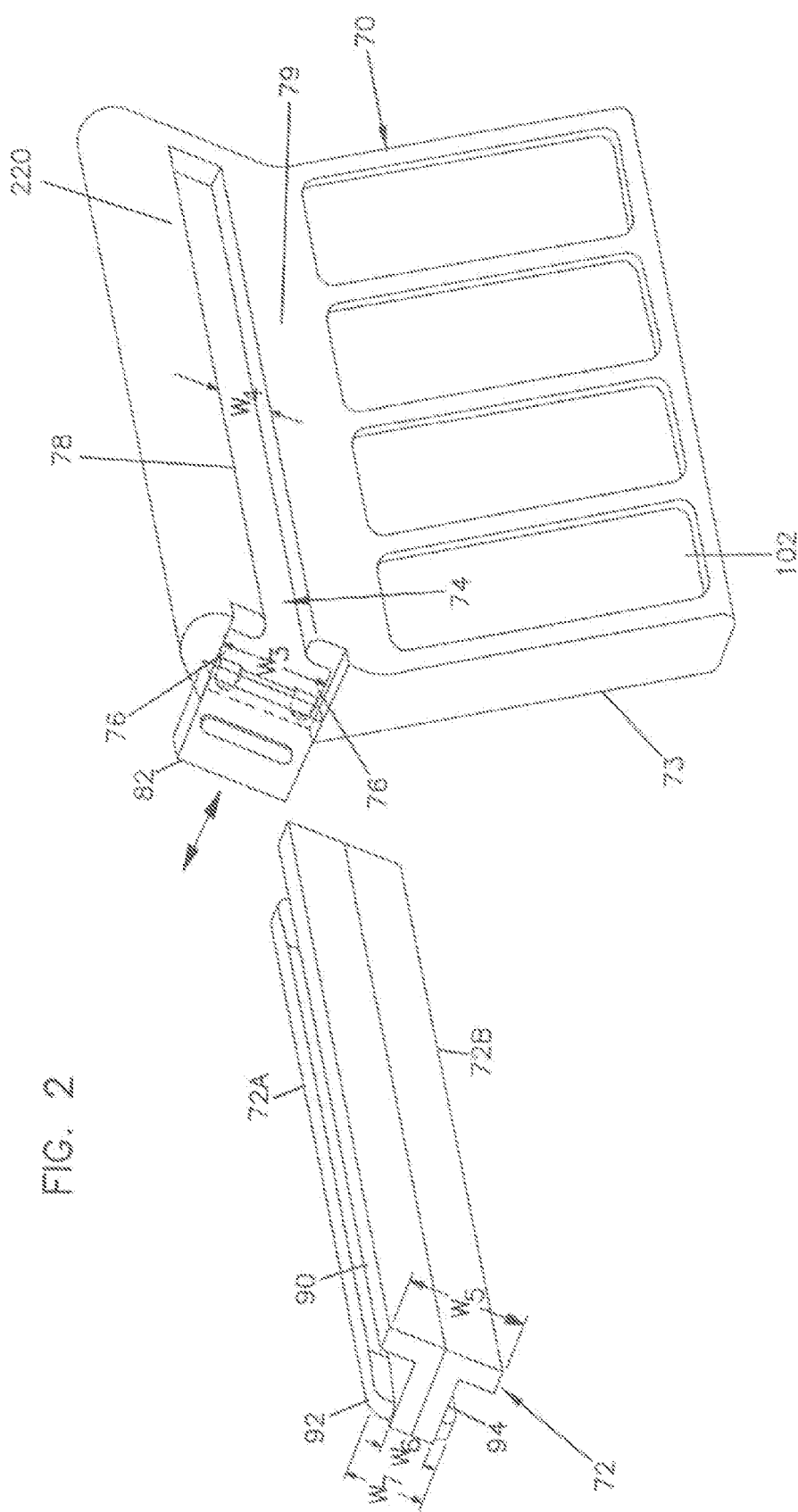
FIG. 2 is a perspective view of an accessory mounting device for mounting an accessory to a track.

Referring now to FIGS. 2 and 3, the accessory mounting device 40 includes an accessory mount such as an accessory mounting bracket 70. The accessory mounting bracket can also be referred to as an accessory mount plate, an accessory mounting structure, an accessory mounting platform or other like descriptive phrases. The accessory mounting device 40 also includes a slide connector 72 for fastening or connecting the accessory mounting bracket 70 to any one of the accessory mounting tracks 34. The slide connector 72 includes enlarged width portions such as first and second flanges 90, 92. The slide connector 72 also includes an intermediate portion 94 that extends between and interconnects the first and second flanges 90, 92. The intermediate portion 94 preferably has a reduced width as compared to widths of the flanges 90, 92. The accessory mounting bracket 70 is connected to one of the tracks 34 by positioning the first flange 90 within the interior region 65 of the track 34, and then by sliding the accessory mounting bracket 70 over the second flange 92. FIG. 3 is a cross-sectional view showing the connector 72 being used to fasten the accessory mounting bracket 70 to the track 34. In a preferred embodiment, both the slide connector 72 and the accessory mounting bracket 70 have a plastic construction to prevent scratching of the boat during use.

I. Accessory Mounting Bracket

Referring to FIG. 3, the accessory mounting bracket 70 preferably has a structure to which an accessory can be readily mounted. In the depicted embodiment, the accessory mounting bracket 70 includes a platform or a plate 73 having a front side 75 to which an accessory such as cup holder, a fish locator, a rod holder, a cellular phone holder, a global positioning device, bimini top bracket or any other accessory can be mounted. FIG. 3 shows a cup holder 50 mounted to the plate 73 by fasteners such as screws 100. In this embodiment, the cup holder accessory includes a flange or base 120 for readily allowing the accessory to be fastened to the plate 73 by screws 100 or other types of fasteners such as bolts, clips, rivets, etc. It will be appreciated that the other accessories can include similar types of bases, flanges or plates. In other embodiments, the accessories can be secured to the accessory mounting bracket 70 by other types of fastening techniques such as VELCRO, a nylon fabric that can be fastened to itself, adhesive, snap fit connections, sliding interlock connections, or other connections. In still other embodiments, accessories may be provided integral with accessory mounting bracket 70.

The accessory mounting bracket 70 can be made by using a molding process such as a plastic injection molding process. As shown in FIG. 2, recesses 102 are provided at the backside of the plate 73 for injection mold thickness control. The recesses also provide locations for accessory bolts (e.g., bolt heads or nuts) to be seated and recessed into the back side 79 of the accessory mounting bracket 70.

Figure 4:
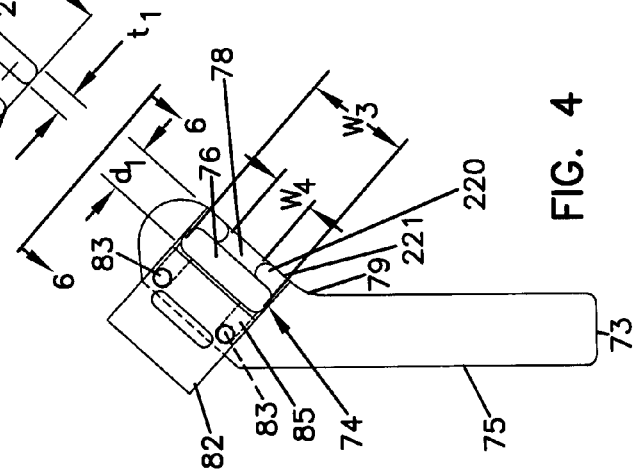
FIG. 4 is an end view of an accessory mounting bracket of the accessory mounting device of FIG. 2.

The accessory mounting bracket 70 also includes structure for receiving or otherwise interlocking with the slide connector 72. For example, referring to FIG. 2, the bracket 70 defines a receptacle such as a channel 74 for receiving the second flange 92 of the connector 72. The channel 74 includes an interior region 76 and also includes a through-opening such as a through-slot 78. The through-slot 78 provides communication between the interior region 76 and the exterior, back side 79 of the bracket 70. As shown in FIG. 4, the interior region 76 has a width $W_3$ that is larger than a corresponding width $W_4$ of the through-slot 78.

Figure 6:
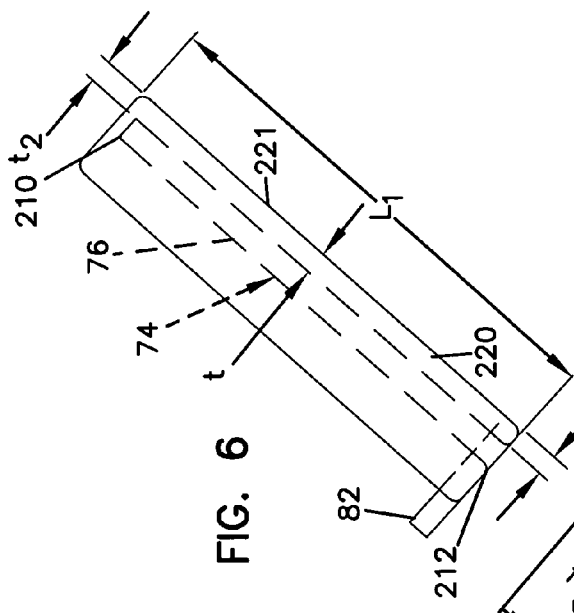
FIG. 6 illustrates the bracket of FIG. 4 viewed from viewing line 6-6.

Referring to FIG. 6, the channel 74 defined by the bracket 70 is elongated and extends along a length $L_1$ between first and second ends 210, 212. The first end 210 is preferably closed, and the second end can be opened and closed by a movable door 82. By opening the door 82, the connector 72 can be inserted into the channel 74 through the open end 212 of the channel 74. Once the connector 72 is positioned fully within the channel 74, the door 82 can be closed to prevent the bracket 70 from being unintentionally removed form the connector 72. Both the interior region 76 and the through-slot 78 preferably extend from the first end 210 to the second end 212.

The channel 74 of the bracket 70 also has a depth $d_1$ (shown in FIG. 4) that extends in a direction from the back side 79 of the bracket 70, through the through-slot 78 to the interior region 76. The depth $d_1$ is generally transversely aligned relative to the length $L_1$ of the channel 74 and is also transversely aligned relative to the widths $W_3$ and $W_4$ of the interior region 76 and the through-slot 78.

The through-slot 78 is defined through a back wall 220 of the accessory mounting bracket 70. As shown in FIG. 3, the exterior, back side 221 of the back wall 220 is adapted to face towards and abut against the track 34 when the bracket 70 is secured to the track 34. As shown in FIG. 6, the back wall 220 has a thickness t measured in the direction of the depth d1. The thickness t preferably gradually increases as the back wall 220 extends from the second end 212 to the first end 210 of the channel 74. In one embodiment, the wall 220 has a thickness t1 of about 0.1719 inches adjacent the second end 212 of the channel 74 and a thickness t2 of about 0.1869 inches adjacent the first end 210 of the channel 74. The taper of the back wall 220 provides a ramp-like configuration that functions as a cam for forcing the back side 221 of the wall 220 against the track 34 as the connector 72 is slid into the channel 74. In this manner, the camming action of the ramp causes the back side 221 of the wall 220 to be pulled tightly against or clamped against the exterior of the track 34 as the accessory mount 70 is slid over the connector 72. By pulling the accessory mount 70 tightly against the exterior of the track 34, the accessory mount can be effectively locked into place and vibration or other movement of the bracket 70 can be prevented. In alternative embodiments, a similar clamping action can be provided by providing a ramp or cam surface on the second flange structure 92 of the connector 72, or by varying the distance/depth between the flanges 90, 92.

Figure 5:
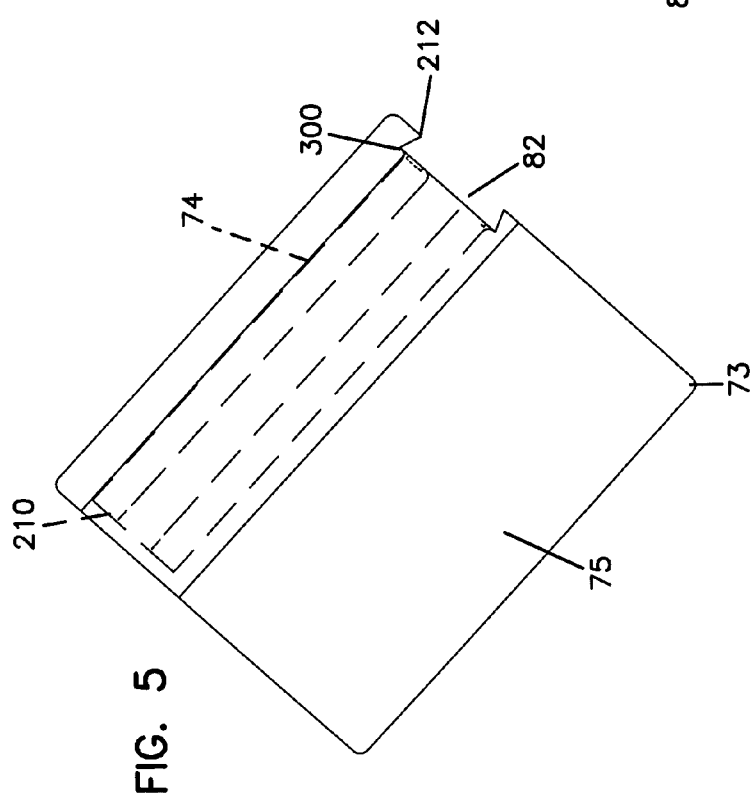
FIG. 5 illustrates the bracket of FIG. 4 viewed from viewing line 5-5.

Referring now to FIG. 5, a dovetail shaped groove 300 is provided adjacent the second end 212 of the channel 74 for mounting the moveable door 82. The door 82 preferably has a corresponding dovetail shape adapted to slide within the dovetail groove 300. As shown in FIG. 4, the door 82 includes a pair of posts 83 that fit within recesses 85 defined adjacent the second end 212 of the channel 74. The posts 83 engage the ends of the recesses 85 to prevent the door 82 from inadvertently being pulled completely from the dovetail groove 300.

II. Slide Connector

Referring to FIG. 2, the slide connector 72 of the accessory mounting device 40 has a generally I-beam shaped configuration. The first flange 90 has a width $W_5$ that is larger than a corresponding width $W_6$ of the intermediate portion 94. Similarly, the second flange 92 has a width $W_7$ that is larger than the width $W_6$ of the intermediate portion 94. In the depicted embodiment, the widths $W_5$ and $W_7$ are generally equal to one another. In other embodiments, the widths $W_5$ and $W_7$ can be different from one another, but are preferably both greater than the width $W_6$. While the connector 72 is shown including enlarged width portions in the form of rectangular flanges, the shape of the enlargements can be varied without departing from the principles of the present disclosure.

When the slide connector 72 is used to secure the accessory mounting bracket 70 to one of the accessory mount tracks 34, the first flange 90 fits within the interior region 65 of the track 34, the second flange 92 fits within the interior region 76 of the bracket channel 74, and the intermediate portion 94 extends through the through-slot 78 of the bracket channel 74 and the access slot 67 of the track 34 (see FIG. 3). In the depicted embodiment, the width $W_6$ is less than the widths $W_1$ and $W_4$, the width $W_5$ is greater than the width $W_1$ and less than the width $W_2$, and the width $W_7$ is greater than the width $W_4$ and less than the width $W_3$.

The connector 72 has a length $L_2$ (see FIG. 9) approximately equal to the length $L_1$ of the channel 74 defined within the bracket 70. The length is arranged generally perpendicular relative to the width $W_5$ of the first flange 90, the width $W_6$ of the intermediate portion 94 and the width $W_7$ of the second flange 92. The connector 72 has depth $d_2$ that extends from the first flange structure 90 to the second flange structure 92.

Figure 8:
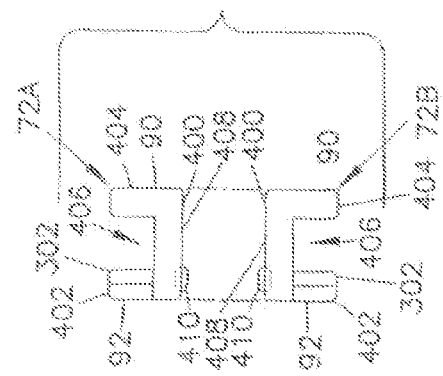
FIG. 8 is an end view of the connector of the accessory mounting device of FIG. 2, the connector is shown separated into two pieces.
Figure 7:
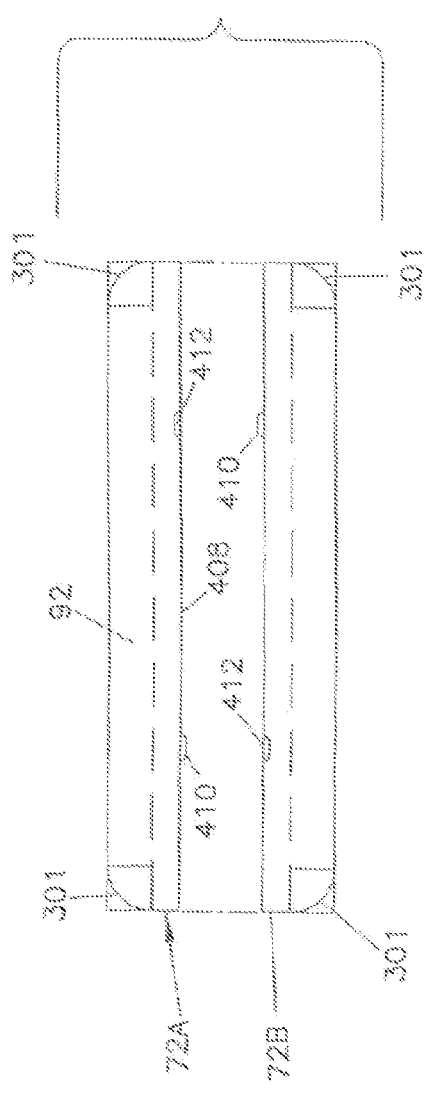
FIG. 7 is a top view of a slide connector of the accessory mounting device of FIG. 2, the connector is shown separated into two pieces.
Figure 9:
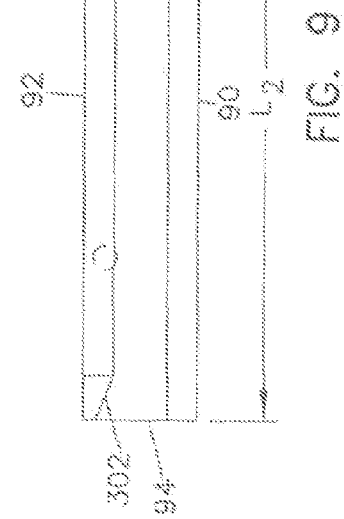
FIG. 9 is a side view of the connector of the accessory mounting device of FIG. 2.

Referring to FIG. 7, the second flange 92 has rounded corners 301 to facilitate inserting the second flange 92 into the channel 74 of the bracket 70. As shown in FIGS. 8 and 9, the ends of the second flange 92 also include ramps 302 to further facilitate inserting the second flange 92 into the channel 74 of the bracket 70.

To facilitate inserting the first flange 90 of the slide connector 72 within the accessory mount track 34, the slide connector 72 includes two separable pieces 72A, 72B. To promote manufacturing efficiency, it is preferred for the first and second pieces 72A, 72B of the connector 72 to have identical constructions. As shown in FIG. 8, each of the pieces 72A, 72B has a generally C-shaped cross-section defined by an intermediate member 400 and two flange portions 402, 404 that project outwardly from the intermediate member 400. The intermediate member 400 and the flange portions 402, 404 cooperate to define an outwardly facing channel 406 that extends along the lengths of each of the pieces 72A, 72B. The pieces 72A, 72B also include mating sides 408 that face in opposite directions from their respective channels 406. The mating sides 408 are adapted to contact one another when the pieces 72A, 72B are coupled together to form the assembled connector 72. Each of the mating sides 408 includes a dimple 410 and a hole 412 (see FIG. 7). When the pieces 72A, 72B are coupled together, the dimple 410 of the first piece 72A fits within the hole 412 of the second piece 72B, and the dimple 410 of the second piece 72B fits within the hole of the first piece 72A. The interaction between the dimples and the holes maintains alignment between the first and second pieces 72A, 72B when the connector 72 is assembled within the track 34.

III. Method of Use

Figure 10:
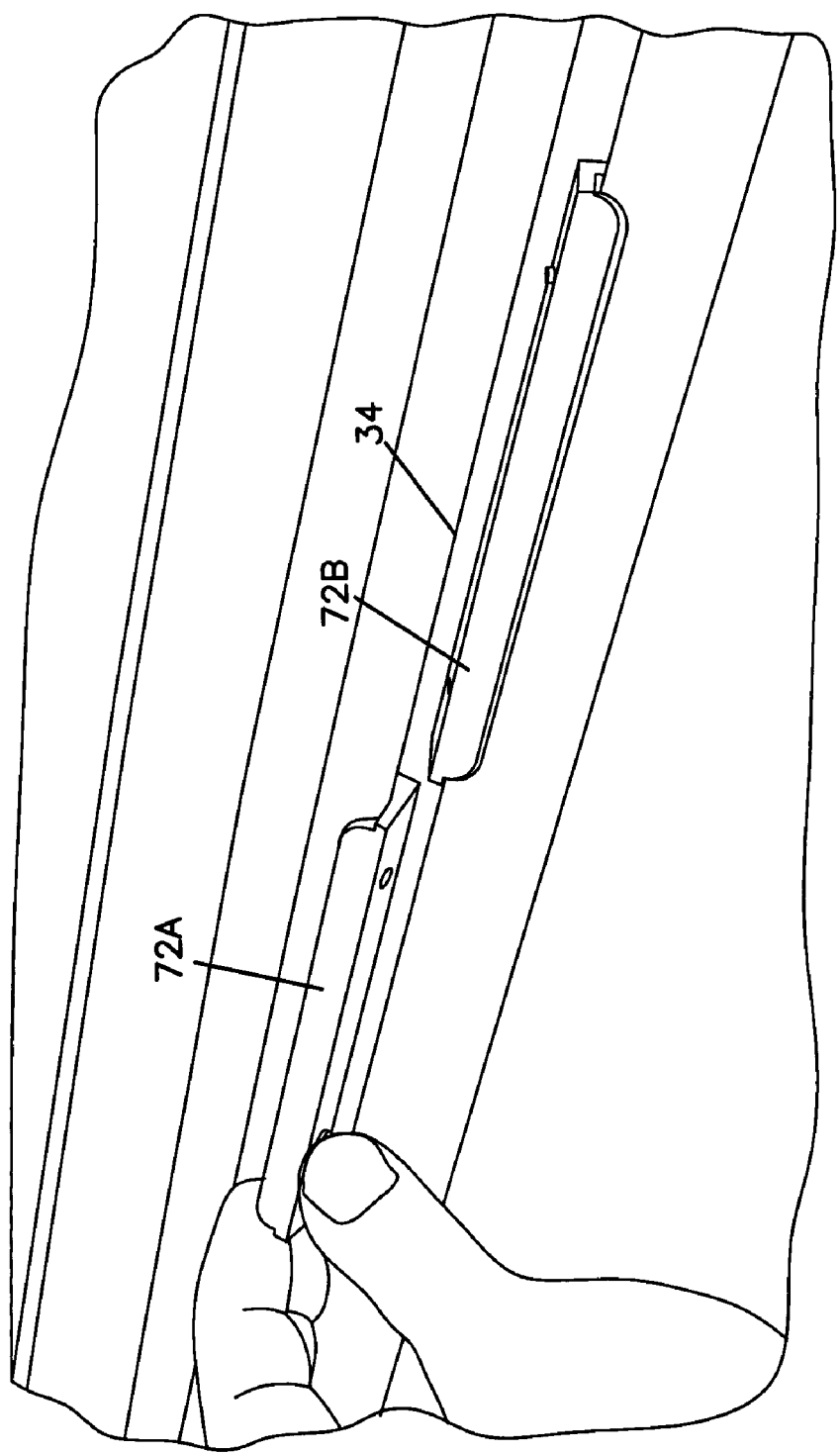
FIGS. 10-14 illustrate a sequence of steps for securing the accessory mounting device of FIG. 2 to a track provided within a boat.
Figure 11:
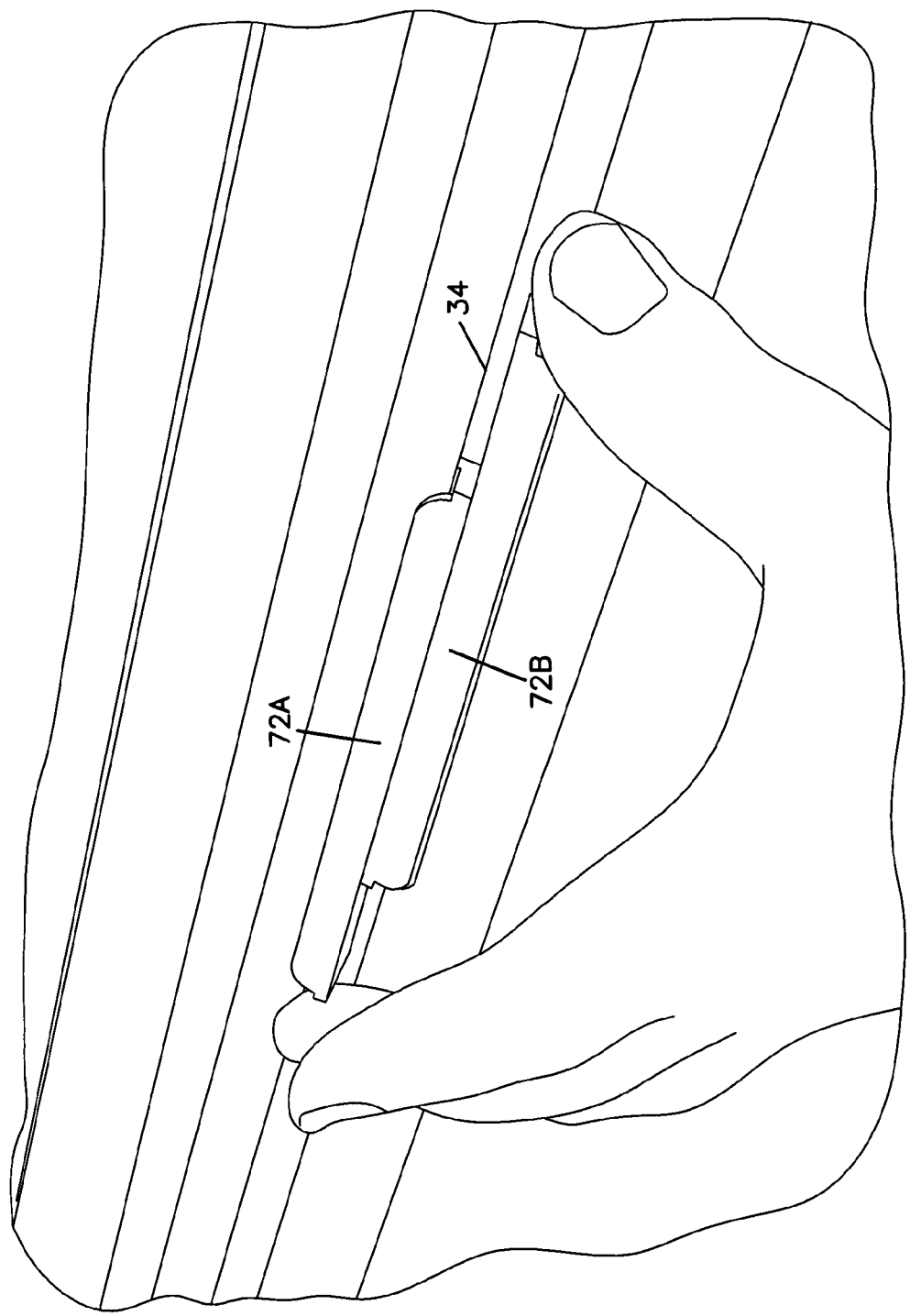
Figure 12:
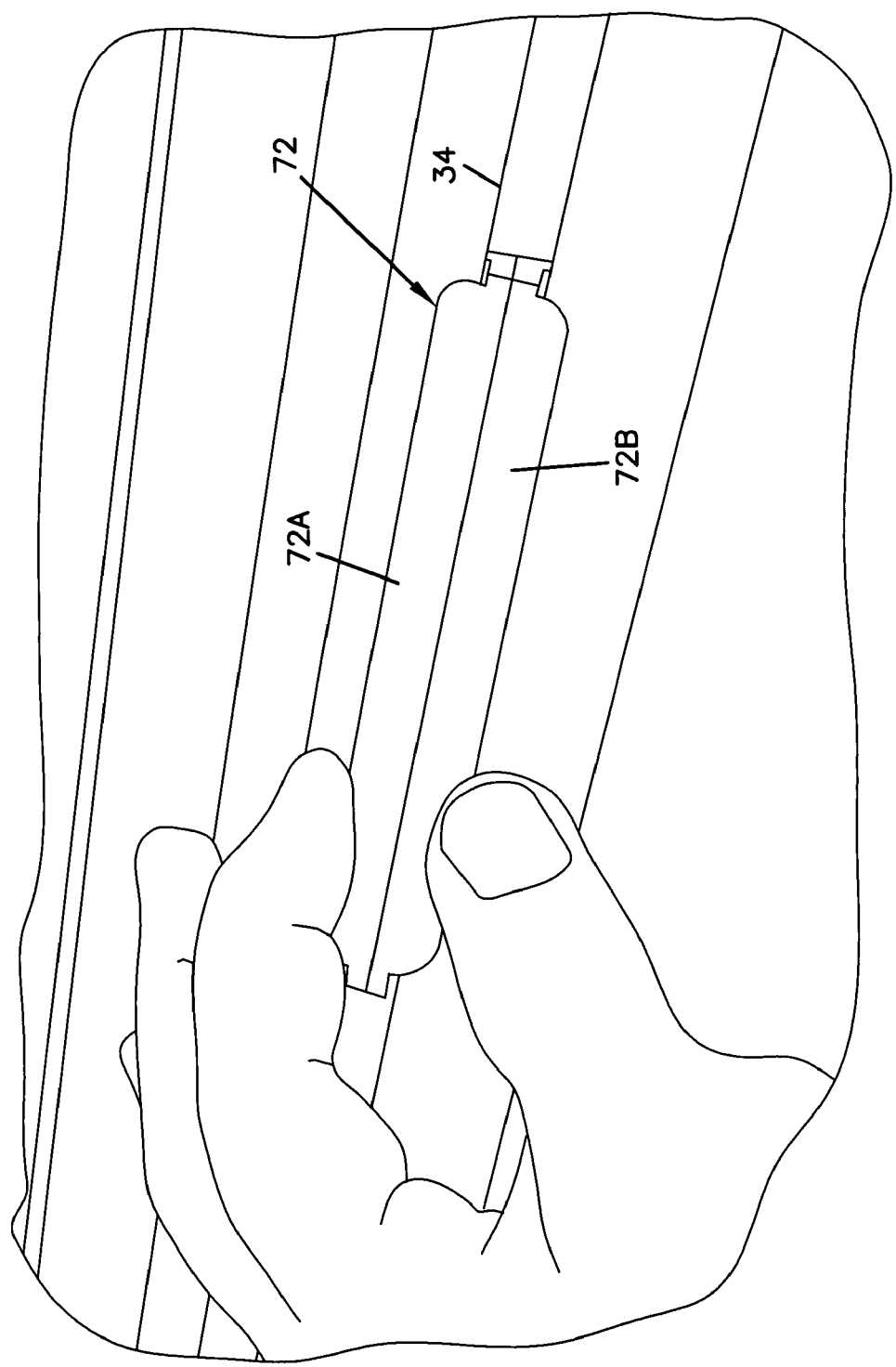

FIGS. 10-14 illustrate a sequence of steps for securing the accessory mounting bracket 70 to the track 34. The sequence begins by inserting the slide connector 72 into the track 34 at a desired mounting location. To insert the slide connector 72 into the track 34, the first and second pieces 72A, 72B of the connector 72 are separately placed into the track as shown in FIG. 10. The separate pieces 72A, 72B are inserted into the track at longitudinally spaced apart locations such that the two pieces 72A, 72B are longitudinally offset from one another. After the pieces 72A, 72B have been individually inserted into the track 34, as shown in FIG. 10, the two pieces 72A, 72B are slid longitudinally together as shown in FIG. 11. When the two connector pieces 72A, 72B are aligned with one another as shown in FIG. 12, the pieces mate/snap together to form the assembled connector 72. Once the pieces 72A, 72B are coupled together as shown in FIG. 12, the first flange 90 of the connector 72 is captured within the interior region 65 of the track and the intermediate portion 94 of the connector 72 projects outwardly from the track through the access slot 67.

Figure 13:
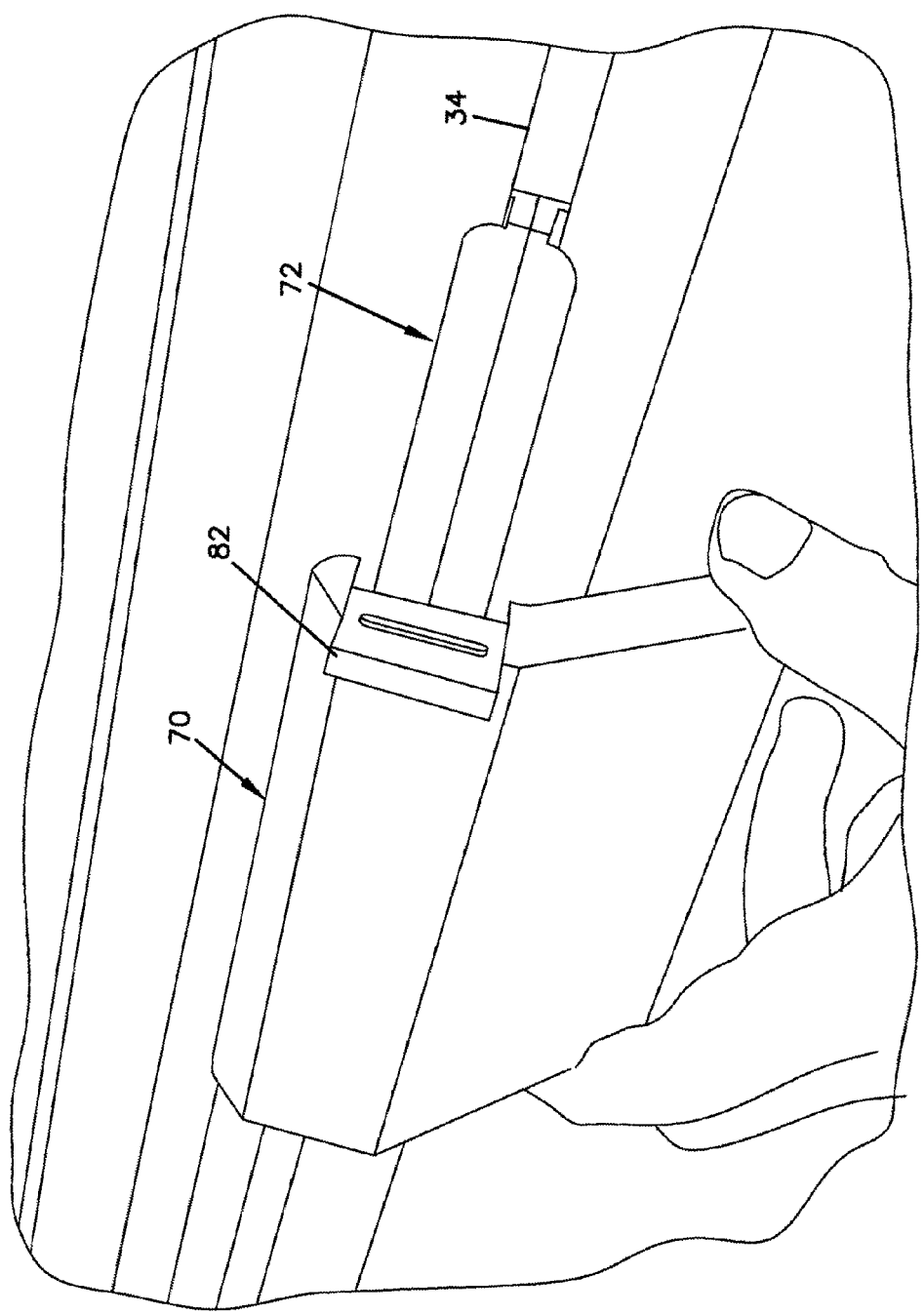

After the connector 72 has been mounted within the track 34 as shown in FIG. 12, the accessory mounting bracket 70 is slid over the slide connector 72 as shown in FIG. 13. The bracket 70 is slid over the connector 72 by opening the door 82 and inserting one end of the second flange 92 into the bracket channel 74 through the second end 212 of the bracket channel 74. The bracket 70 is then slid along the connector 72 until the entire length of the second flange 92 is housed within the interior region 76 of the bracket channel 74. Once the bracket 70 is fully slid over the connector 72, the door 82 can be closed as shown in FIG. 14 to block the end 212 of the bracket channel 74 such that the bracket 70 is prevented from being inadvertently displaced from the connector 72.

Figure 14:
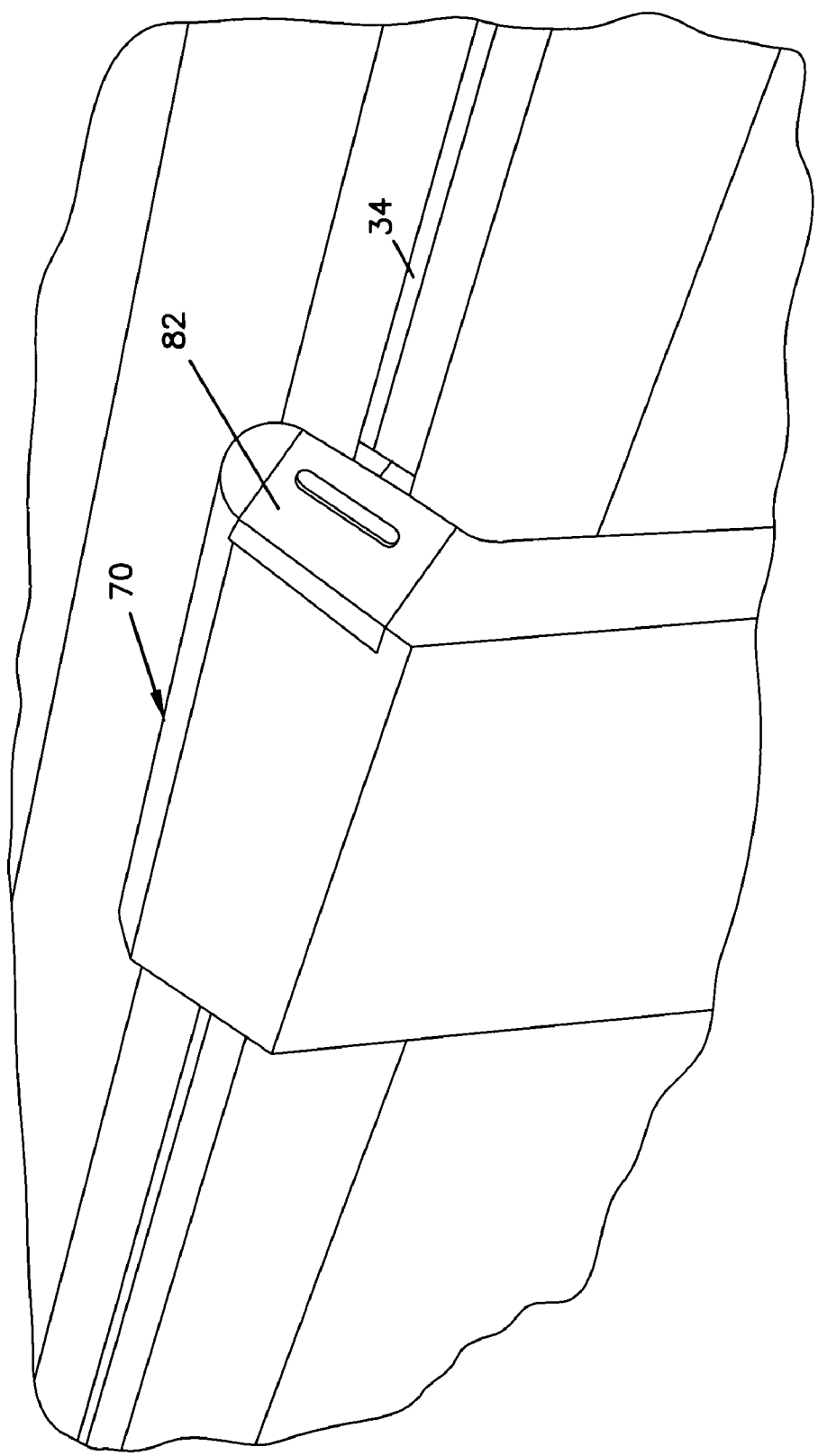

With the accessory device secured to the track 34 as shown in FIG. 14, the first flange 90 of the connector 72 is captured within the interior region 65 of the track 34, the second flange 92 of the connector 72 is captured within the interior region 76 of the bracket channel 74, and the intermediate portion 94 of the connector extends through the access slot 67 of the track 34 and the through-slot 78 of the bracket channel 74 (see FIG. 3). As the bracket 70 is slid over the connector 72, the ramped configuration of the bracket channel 74 (shown in FIG. 6) causes the bracket 70 to be drawn tightly against the track 34 to resist movement or vibration of the bracket 70 relative to the track 34.

In FIGS. 10-14, no accessory is shown mounted to the bracket 70. It will be appreciated that in normal use, an accessory will be pre-attached to the bracket 70 prior to fastening the bracket 70 to the track 34. Also, when sliding the connector 72 into the bracket 70, the connector 72 can be held fixed while the bracket 70 is moved over the connector 72, or the bracket 70 can be held fixed while the connector 72 is moved into the bracket 70, or the bracket 70 and the connector 72 can be simultaneously moved relative to one another.

To remove the bracket 70 from the connector 72, the door 82 is opened, and the process described above is reversed. By removing the bracket 70 from the connector 72, the connector 72 can be moved to different locations on the track 34 to readily vary the location of the accessory without requiring any holes to be drilled.

To facilitate inserting the bracket 70 over the slide connector 72, a lubricant such as a petroleum jelly or lip balm can be applied along the walls of the bracket channel 74 and along the back side of the bracket 70.

With regard to the forgoing description, changes may be made in detail, especially with regard to the shape, size and arrangement of the parts. For example, while it is preferred for the slide connector to have multiple pieces (e.g., two pieces) to facilitate inserting the connector into the track, embodiments having single piece slide connectors are also within the scope of the present disclosure. For such embodiments, the connectors can be inserted into the track through open ends of the track or through enlarged access openings provided in the track. It is intended that the specification and depicted aspects be considered illustrative only and not limiting with respect to the broad underlying concepts of the present disclosure.

What is claimed is:

1. An accessory mounting device and track assembly, for mounting an accessory to a track provided on a boat, the device comprising:

an accessory mounting bracket;

a slide connector including a first portion having an enlarged width that fits within the track and a second portion having an enlarged width that fits within the accessory mounting bracket, and a reduced width portion that connects the first portion and the second portion;

the second portion over which the accessory mounting bracket is slid to secure the accessory mounting bracket to the track, the accessory mounting bracket being slid over the slide connector in a direction generally parallel to the track;

the slide connector being generally symmetrical in cross section and generally I-beam shaped;

the accessory mounting bracket being of a complementary shape to accommodate and receive the slide connector; and the slide connector and accessory mounting bracket being selectively positionable within the track in a plurality of locations.

2. The device of claim 1, wherein the accessory mounting bracket and the slide connector each have a plastic construction.

3. The device of claim 1, further comprising a cam for causing the accessory mounting bracket to be compressed against the track as the accessory mounting bracket is slid over the slide connector.

4. The device of claim 1, wherein at least one of the accessory mounting bracket and the slide connector includes a ramp for causing the accessory mounting bracket to be drawn against the track as the accessory mounting bracket is slid over the slide connector.

5. The device of claim 1, wherein the slide connector includes at least two pieces.

6. The device of claim 1, further comprising an accessory mounted to the accessory mounting bracket.

7. An accessory mounting device for mounting an accessory to a track, the device comprising:

an accessory mounting bracket defining a receptacle having an interior region and a through-opening and an exterior of the accessory mounting bracket;

a connector including a first enlarged width portion separated from a second enlarged width portion by an intermediate portion, the second enlarged width portion being configured to be received within the interior region of the receptacle, the intermediate portion being configured to extend through the through-opening of the receptacle when the second enlarged width portion is positioned within the interior region of the receptacle, and the first enlarged width portion being configured to fit within the track;

the connector including 2 separate generally half-pieces that are positioned together;

the receptacle including an open end for allowing the second enlarged width portion of the connector to be inserted into the interior region and the intermediate portion of the connector to be inserted through the through-opening of the receptacle; and the connector being generally symmetrical in cross-section, and the accessory mounting bracket being of a complementary shape to mate with the connector.

8. The device of claim 7, further comprising a moveable door for closing the open end of the receptacle after the connector has been inserted into the receptacle.

9. The device of claim 7, further comprising a cam structure for drawing the accessory mounting bracket toward the track as the connector is inserted into the receptacle such that the accessory mounting bracket is clamped against the track.

10. The device of claim 9, wherein the cam structure includes a ramp surface.

11. The device of claim 10, wherein the ramp surface is provided within the receptacle.

12. The device of claim 7, wherein the receptacle includes an elongated channel, wherein the through-opening includes a through-slot, and wherein the connector has a generally I-beam shaped configuration.

13. The device of claim 7, wherein the track is provided on a boat.

14. An accessory mounting device comprising:

an accessory mount defining an elongated channel having an interior region and a length that extends between first and second ends, the channel also including a through-slot that extends along the length of the channel, the through-slot providing communication between the interior region and an exterior of the accessory mount;

an elongated connector including, a length that extends between first and second ends, the connector including an enlarged width portion configured to fit within the interior region of the channel and a reduced width portion configured to extend through the through-slot of the channel when the enlarged width portion of the connector is portioned within the interior region of the channel, the connector being positioned within the channel by inserting the connector through the first end of the channel;

a moveable door for closing the first end of the channel after the connector has been inserted within the channel; and the elongated connector being generally symmetrical in cross-section, and the accessory mounting device being of a complementary shape to mate with the connector.

15. An accessory mounting device for mounting an accessory to a track, the device comprising:

an accessory mount defining an elongated channel having a length that extends between first and second ends, the channel also including a through-slot that extends along the length of the channel, the channel further including an interior region that extends along the length of the channel, the through-slot providing communication between the interior region and an exterior of the accessory mount, the channel having a depth that extends in a direction from the exterior of the accessory mount through the through-slot to the interior region, the through-slot and the interior region having widths measured an a direction generally transverse relative to the length and the depth of the channel, the width of the through-slot being smaller than the width of the interior region;

an elongated connector including a length that extends between first and second ends, the connector also including a first enlargement separated from a second enlargement by an intermediate portion, the second enlargement being configured to be received within the interior region of the channel, the intermediate portion being configured to extend through the through-slot of the channel when the second enlargement is positioned within the interior region of the channel, and the first enlargement being configured to fit within the track; and the elongated connector being generally symmetrical in cross-section, and the accessory mounting device being of a complementary shape to mate with the connector.

16. The device of claim 15, wherein the first end of the channel is open for allowing the connector to be inserted into the channel.

17. The device of claim 16, further comprising a moveable door for closing the first en of the channel after the connector has been inserted into the channel.

18. The device of claim 15, further comprising a cam structure for drawing the accessory mount toward the track as the connector is inserted into the channel such that the accessory mount is pressed against the track.

19. The device of claim 18, wherein the cam structure includes a ramp surface.

20. The device of claim 19, wherein the ramp surface is provided within the channel.

21. The device of claim 15, wherein the connector includes at least 2 separate pieces that are positioned together.

22. The device of claim 15, wherein the connector includes 2 generally half-pieces.

23. The device of claim 15, wherein the connector has a generally I-beam shaped configuration.

24. The device of claim 15, wherein the track is provided on a boat.

25. The device of claim 15, wherein the accessory mount and the connector are plastic.

26. An accessory mounting device for mounting an accessory to a track defining a first channel including an interior region accessible through an access slot, the device comprising:

an accessory mount defining an elongated second channel having a length that extends between first and second ends, the second channel also including a through-slot that extends along the length of the second channel, the second channel, the second channel further including an interior region that extends along the length of the second channel, the through-slot providing communication between the interior region of the second channel having widths measured an a direction generally transverse relative to the length and the depth of the second channel, the width of the through-slot being smaller than the width of the interior region of the second channel; and a connector for connecting the accessory mount to the track, the connector including a first flange separated by a second flange by an intermediate portion, the first flange being configured to be received within the interior region of the second channel, and the intermediate web being configured to extend through the access slot of the first channel and the through-slot of the second channel when the first flange is positioned within the interior region of the first channel and the second flange is positioned within the interior region of the second channel;

the connector being positioned in the second channel by inserting the connector through the first end of the second channel and sliding the connector along the length of the second channel;

the connector including at least 2 separate pieces; and either the connector or the accessory mount including a cam structure for causing the accessory mount to be compressed against the track as the connector is inserted into the channel.

27. The device of claim 26, wherein the connector is generally I-beam shaped.

* * * * *